Patented Oct. 29, 1935

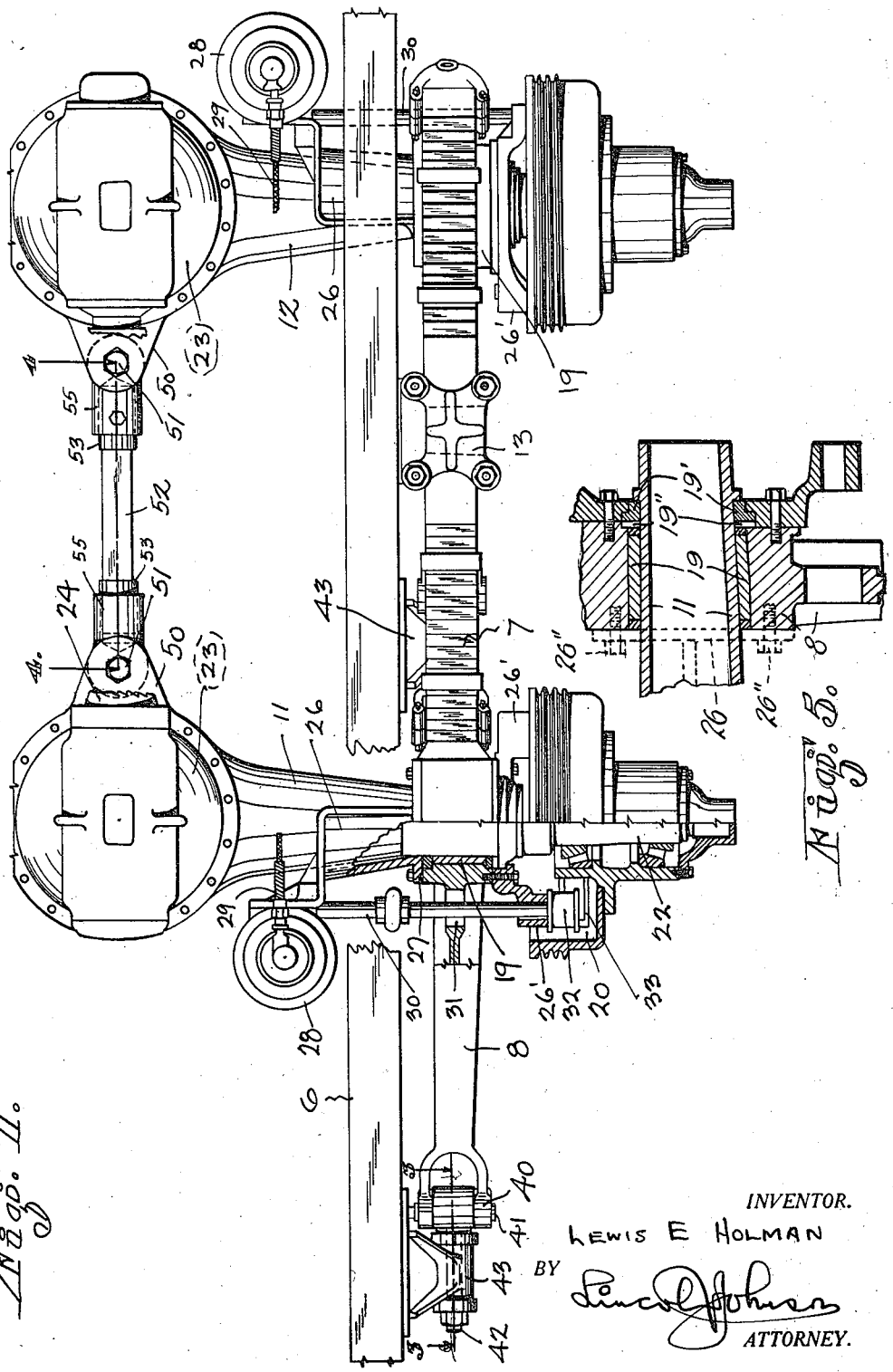

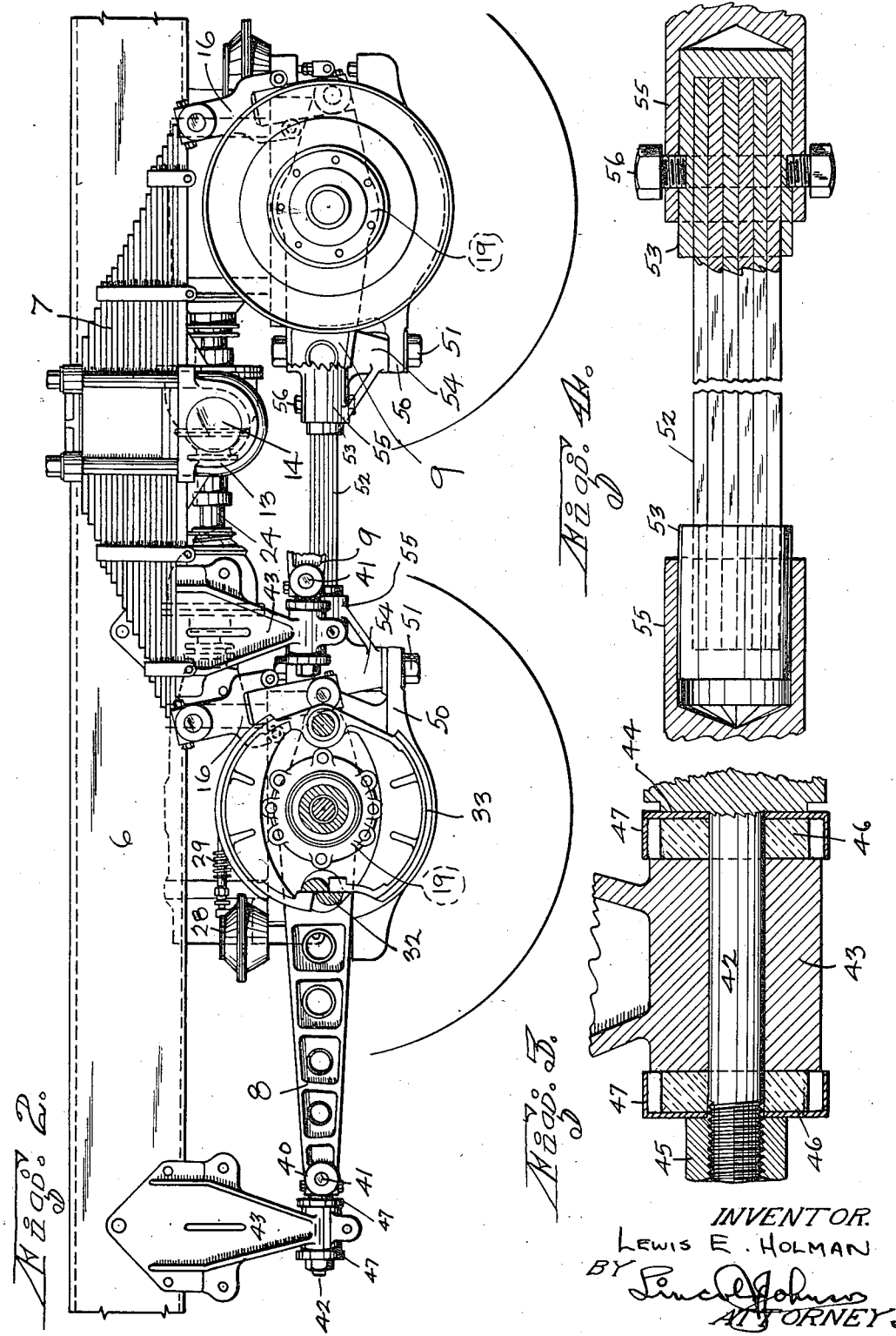

2,019,308

UNITED STATES PATENT OFFICE 2,019,308

SPRING SUSPENSION AND TORQUE APPARATUS FOR MOTOR VEHICLES

Lewis E. Holman, Oakland, Calif.

Application April 21, 1931, Serial No. 531,702

11 Claims. (Cl. 180—22)

The invention relates to vehicles and particularly to motor vehicles of the type having tandem axles, that is, two axles arranged one behind the other on the vehicle.

An object of the invention is the provision of means for causing the partial absorbing of shock or displacement of one axle housing, by transmitting the said shock or displacement to the other axle housing, in such a manner as to minimize the shock transferred to the chassis of the vehicle to which the axle housings are connected, and not to interfere with the free movement of the respective axle housings.

Another object of the invention is the provision of means to support the rear truck of a road vehicle upon the chassis, so as to allow free displacement of each axle housing of the truck on a variable vertical arc around a horizontal transverse pivot at a substantially constant distance from the vehicle frame, means being provided to connect said axle housings to the chassis in such a manner that the shock or displacement imposed on one axle housing is transmitted to the other axle housing, whereby the effect of the shock upon the chassis of the vehicle is minimized.

Particularly it is the object of my invention to provide a spring suspension for a four wheel truck of a road vehicle, which suspension consists in the connection of the opposite ends of a pair of axle housings to the opposite ends of a leaf spring, the latter being pivotally mounted intermediate its ends on each of the opposite sides of the chassis, and in the limiting of the displacement of each axle to a variable arcuate path determined by a rocker arm fulcrumed on the chassis.

A still further object of the invention is to provide a resilient connection between tandem axle housings, to resist the torque tending to rotate said axles, said resilient connection consisting of layers of spring bars connected at one end by a vertically disposed pivot to one axle housing and connected at the other end by a slidable and rotatable and vertically disposed pivot to the other axle housing, whereby the respective axle housings are capable of independent movement.

Other objects and advantages are to provide a motor vehicle of the type having tandem axles, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings in which

Fig. 1 is a fragmentary plan view, illustrating the connection of a four wheel truck to the chassis of the vehicle, on one side, the other side being broken away;

Fig. 2 is a side view, partly in section of the four wheel truck suspended on a chassis, in accordance with my invention.

Fig. 3 is a sectional view thru the radius arm connection to the vehicle frame.

Fig. 4 is a side elevation partly in section of the torque neutralizing bar.

Figure 5 is a fragmentary sectional view of one of the axle housings showing the mounting of one of the radius rods thereon, the radius rod also being shown in section.

In the general organization of my invention, identical spring suspensions are provided on each side of a chassis 6. Each suspension comprises a leaf spring 7 journaled on the chassis intermediate its ends; and rigid radius rods 8 and 9, each radius rod being pivotally connected at one end to the chassis 6, in spaced relation. The other or rocking ends of the radius rods 8 and 9 are flexibly connected to the opposite ends of each leaf spring 7. The rocking ends of the radius rods 8 and 9 have adjacent the springs 7 the opposite ends of the axle housings 11 and 12 respectively, journaled therein. By this suspension the displacement of the axle housings causes the rocking of the respective radius rods in a vertical plane, so as to equalize the shock throughout the leaf spring 7 and throughout the rods 8 and 9, whereby the shock that may be imparted to the chassis 6 is minimized. Inasmuch as the radius rods 8 and 9 are rigid, the axles are in all positions at substantially the same radial distance from the fulcrums of the respective radius rods.

The pivoted end of each radius rod is provided with a horizontally disposed bearing 40 thereon through which a pin 41 passes, said pin 41 being mounted on the end of a stub shaft 42. The shaft 42 is journaled in a bearing 43 mounted on the side of the frame 6. The shaft 42 is provided with a shoulder 44 on one side of the bearing 43 and a nut 45 is threaded onto the other end of said shaft on the opposite side of the bearing 43. Rubber washers 46 are mounted around the shaft 42, between opposite sides of the bearing 43 and the shoulder 44 and nut 45. The shaft 42 is free to move axially in either direction in the bearing 43 within the limits of compression of the opposite rubber washers 46, and the shaft is also free to rotate in said bearing 43. By reason of the pivotal connection of each radius rod to the frame 6, each radius rod can swing in a vertical plane, and the arc prescribed by the end of each rod connected to the leaf spring 7 shifts with its fulcrum between minimum and maximum limits according to the compressive action applied to the rubber washers, through which the pivoted end of the rod is connected to the frame. Each washer 46 is enclosed by a cap 47.

Carrying out my invention, I dispose the equalizing leaf spring 7 preferably midway between the swinging ends of the radius rods 8 and 9. The leaf spring 7 is provided intermediate its ends, and preferably at its center, with a bearing block 13 which is journaled on a stub shaft 14 carried by the chassis 6. The leaf spring 7 is therefore free to oscillate on the shaft 14. The free ends of the leaf spring 7 preferably lie vertically above the rocking ends of the radius rods 8 and 9, and each end of the leaf spring 7 is connected to the respective radius rod end by a universal shackle 16. When either one of the radius rods 8 and 9 is rocked by a shock or displacement of the respective axle housing 11 or 12, the leaf spring 7 not only acts to absorb the shocks thus transmitted thereto from the radius rods but, when the shock is too great for absorption, transfers the shock, by reason of its pivoted mounting, to the other radius rod, so the shock is distributed throughout the entire spring suspension and varying to a predetermined degree the radial distance of the axle housings from the fulcrums of the respective radius rods.

The radius rod 8 is fulcrumed at its pivoted end on the bearing 43 for vertical rocking, which bearing in turn is mounted on the chassis 6. The pivoted end of the other radius rod 9 is fulcrumed on a similar bracket bearing 43 mounted on the chassis 6 so as to rock in the same vertical plane as the radius rod 8. The axle housings 11 and 12 are secured to the radius rods 8 and 9 respectively, intermediate the ends of the respective radius rods, and preferably closer to the swinging or rocking end than to the pivoted end of each radius rod. The securing of the axle housings 11 and 12 to the radius rods 8 and 9 is effected in a bearing or journal 19 in the swinging end of the rod, so as to allow limited sliding and rotative movement of the axle housing and variable arcuate movement of the rods when the rods are rocked; the journals 19 provide for the rotative adjustment of the axle housings 11 and 12. The slight axle sliding clearance 19″ is accomplished by providing a collar 19′ on each axle housing outside of and spaced from the outer ends of the bearings 19. The tapered shape of each housing 11 or 12 permits them to be wedged in the radius rods 8 or 9 as they slide outwardly and thus limit the outward play of the housings. The collars 19′ contact the outer ends of the bearings 19 as the housings slide inwardly and thus, limit the inward play of the housings. The radius rods have fixedly attached thereto, the inside face thereof by means 26″, a stationary flange or saddle 26 carrying the mechanism for operating the brake 20.

The saddle 26 on the inside face of each radius rod carries the mechanism for operating the brake 20, and a pair of bearing supports 26′ are provided on the outer face of each radius rod to support the braking apparatus in relation to the brake drums on the vehicle wheels. The saddle 26 and braking mechanism are fixed on each radius rod and move with it, whereby the axle housing is free to rotate or slide or move to a limited extent in its journal in the radius rod without interfering with the operation of the braking apparatus.

The axle housings 11 and 12 each have the usual driving axles 22 and differentials 23 therein, connected to each other by a suitable adjustable and flexible driving shaft 24 whereby allowance is made for the limited movement of the axle housings relative to each other.

During the rocking movement of the rods 8 or 9, each of the housings are moved in a vertical plane on a variable arc of a substantially fixed radius that is to say, the radius varies within the limits of compression of the rubber washers 46, thus the radial distance of the axle housings 11 and 12 from the bearings 43 is fixed between minimum and maximum limits, consequently an approximately fixed relation is established horizontally between the power plant of the vehicle and the driving axles 22. The slight turning movement of the axle housings 11 and 12 in the rod bearings 19, reduces the torque of the shocks upon the housings. The rods 8 and 9 are rigid throughout and of sufficient strength to prevent the springing thereof under the effect of a shock thereon, thus the radius rods form rigid torque bars effectively determining the position and path of displacement of the axle housings, under all circumstances.

Each of the axle housings 11 and 12 on sides thereof facing each other, is provided with a projection 50 within which is mounted a pin 51, having the axis thereof disposed vertically. A bar to resist rotation or turning movement of the respective axle housings, from torque or other forces, is adapted to connect said housings together. This torque resisting connection consists of a laminated bar 52 formed of layers of spring steel, and having a cylindrical cap 53 encasing each of the ends of said bar. Each cap 53 is formed with a square recess therein into which the bar ends are securely fastened, so that the bar cannot turn or move in either cap. A bearing 54 is journaled on the pin 51 on each axle housing, said bearing having a tubular housing 55 extended therefrom on a horizontal plane at a right angle to the axis of the pin 51. Each bearing 54 is free to rotate on a vertical axis in a horizontal plane. The caps 53 on the opposite ends of the torque resisting bar are each adapted to be confined in one of the tubular housings 55 on the respective axle housings 11 and 12. One of the housings 55 is provided with set screws 56 therein to engage a cap 53 and to hold it in a set position therein, while the other cap is adapted to be slidably and rotatably confined in the other housing 55. The caps 53 on the bar 52 would be set into the housings 55 so that the laminations of the bar lie in a horizontal plane and the mediate portion of said bar could be flexed or bended in a vertical plane, by torque forces tending to rotate the axle housings 11 and 12. The axle housing of any vehicle is caused to twist in an opposite direction to the movement of the traction wheels due to the tendency of the driving pinion or worm in the axle housing to climb the ring gear of the differential in an effort to get away from rotating the traction wheels. Where tandem axle housings driven from a common source of power are used to support two pairs of traction wheels, the tendency of both axle housings is to twist when the driving torque is applied. Tandem axle housings having driven axles therein require a torque neutralizing connection between the housings to neutralize or resist the torque reaction. It is mechanically impossible to apply the driving power to both axle housings uniformly at all times under all conditions in which a motor vehicle operates, because in almost every instance driving power is applied to one axle housing before the other. Recognizing that the one axle housing will get a torque reaction before the other, I have provided a construction which will neutralize said reaction but which will not interfere with driving power being transmitted to the other housing. The second housing might also have a torque reaction which would be neutralized by the vertically bendable torque bar. The torque bar permits a torque reaction of either or both housings to a point where the driving power is transmitted equally to all traction wheels under any and all driving conditions, at which point it is conceivably easier to move the vehicle than to twist the housings.

The driving power from the engine is directed into the differential and axles of one axle housing and from that differential thru the drive shaft 24 to the differential and axles in the other housing. The power applied to a single pair of traction wheels may be sufficient to start the vehicle in motion and such movement will bring the other axle housing into driving registry with the first housing, whereby the driving power would be transmitted uniformly to all traction wheels and each would be doing an equal part of the work. Where the power applied thru one axle housing only would be insufficient to start the vehicle in motion, the driving power would "back up" thru the axles and differential of the first housing, thru the drive shaft 24, onto the axles and differential of the other housing, and the torque or turning movement of said power, in its endeavor to rotate the traction wheels and overcome the inertia of the load on said second axle housing, tends to rotate said second housing out of its normal position around the axles therein. Torque tending to rotate or oscillate the axle housing from its normal position (due to the inability of torque to rotate the traction wheels) reacts against the torque resisting bar 52 which bends or flexes in a vertical plane to a point where the axle housing is stopped from turning. Usually the torque bar 52 is never bent to its maximum degree of deflection, due to the fact that the power torque tending to rotate the axle housing, applies itself to the traction wheels on said second axle housing and starts the traction wheels in motion before the bar 52 is flexed to the limit. In actual practice the traction wheels on one housing endeavor to start rotating before the traction wheels on the other housing, thereby causing a "backing up" of driving power to the wheels of the axle housing that lags behind until the torque transmitted to the lagging housing causes it to oscillate a slight distance so that the traction wheels thereon can "catch up" and rotate in unison with the first mentioned wheels. The flexible torque bar between the housings permits the housings to automatically adjust themselves relative to each other and to "even up" the driving power delivered to the respective axle housings. A solid torque bar between axle housings will not permit the driving power to be distributed equally between the respective housings, and as a result one axle housing will always receive a greater part of the driving power than the other axle housing. The flexible torque bar permits the axle housings to oscillate around the axle axis, to tilt in a vertical plane, and to move laterally in a horizontal plane, independently of each other.

The saddle 26 is secured by a flange 27 to the inner side of each of the radius rods 8 and 9, said saddle becoming a fixed part of the radius rods and moving therewith in all movements prescribed by said rods. The saddle 26 may be moved so as to conform to the outside contour of the axle housing but lies in spaced relation thereto. Each saddle is provided with an air chamber 28 on the free end thereof and said chamber is connected by a flexible conduit 29 to a source of air supply. The conduit 29 also connects with a controlling mechanism by which the volume and amount of air delivered to the chamber is regulated. The chamber 28 is provided with actuating mechanism therein, which connects to a shaft 30 suitably journaled on the saddle 26, said shaft extending out through an opening 31 provided centrally on each radius rod, and terminates in a cam 22 within the brake housing 20. The brake 20 has shoes 33 therein of the internally expanding type, and the cam 32 causes said shoes to be moved outwardly into frictional contact with the inner circumference of the brake drums 20. It is necessary that the brake operative mechanism be mounted upon a base which will move at all times in unison with the radius rods, whereby braking effort can be applied to the brakes in any position which the axle housing may assume relative to the vehicle frame or traction surface. If the brake operating mechanism were mounted on the axle housings or on the vehicle frame, and did not move in direct relation with the radius rods, it would be mechanically impossible to transmit any breaking effort to the brake drums. With the construction that I have described, the braking mechanism bears a direct relation to the radius rods and moves therewith, to transmit braking effort to the brake drums without regard to any relative differences in position which might exist between the axle housings and radius rods.

A torque reaction from the traction wheels might also tend to twist the axle housings in the event the brake shoes on the radius arm would be engaged with the brake drum on the traction wheel. This type of torque reaction would manifest itself throughout the system of parts supporting and connecting the axle housings to the vehicle, in substantially the same way as the torque reaction heretofore described. Torque reaction from the wheels would be initially transmitted to and partially dissipated through the radius rods, thereby minimizing the amount or torque to be neutralized by the spring torque bar.

As heretofore described the ends of the axle housings are journaled to slide axially to a limited degree, or rotate in the ends of the radius rods, to thereby effect the proper trailing of the traction wheels on one axle housing behind the wheels on the other housing in negotiating turns or curves. Where the axle housings would be fixedly located in the radius rods, without any freedom of sliding or rotating movement, the wheels would not trail around curves but instead would continuously slide sidewise while rotating, thus doing great damage to the wheel tires, rendering inefficient the application of power to the wheels, and making the vehicle relatively unmanageable to steer.

It will be recognized that a particularly efficient spring suspension is provided to support a four wheel or six wheel truck on the chassis of a vehicle, which suspension is simple in construction and positive in operation; the spring suspension does not require any adjustment; the universal shackles connecting the leaf spring to the respective radius rods allow certain transverse and longitudinal play; thus a spring suspension constructed in accordance with my invention maintains the axles in proper position and acts with maximum efficiency to absorb and distribute road shocks.

Having thus described this invention, what I claim and desire to secure by Letters Patent is:

1. In a vehicle, transverse axle housings, having driven axles therein, connected to each other, each axle housing having means of connection with a pair of supporting wheels, in combination with a chassis, a leaf spring pivotally mounted intermediate its ends upon each side of the chassis; a pair of rigid elements swingingly mounted on each side of the chassis and each having an end of each element journaled to receive an end of each axle housing and being operatively connected to the opposite ends of the leaf spring on each side of the chassis; the respective axle housings being rotatably and slidably secured in said rigid elements, means to limit the rotation of said axle housings in said elements; and means to limit the sliding of said axle housings in said elements.

2. A torque resistor for tandem axle housings containing driven axles; comprising a plurality of spring bars, cylindrical caps confining the opposite ends of the bars to unite the same for simultaneous action, the cap on one end of said spring bars being fixedly attached to one of the axle housings and the other cap being slidably confined in the other axle housing, whereby the mediate portion of the spring bars is free to bend in a vertical plane to neutralize the torque tending to rotate the axle housings.

3. A torque resistor for tandem axle housings having driven axles therein, consisting of a bar adapted to flex in a vertical plane, having one end thereof pivoted on a vertical axis to one of the axle housings to swing on a horizontal plane and the other end slidably confined in a vertical pivot on the other axle housing whereby said end of the bar is free to slide axially or rotate or swing on a horizontal plane when either of said axle housings moves in a vertical plane relative to the other or torque tends to rotate either housing or both housings.

4. A road vehicle including a frame, tandem axle housings having driven axles therein; a spring pivotally associated with each of the opposite sides of the frame and having the ends connected to the spaced axle housings, means of connection between the frame and the end of each spring and the housing ends fulcrumed so that the housings are capable of independent swinging movement relatively to the frame around the fulcrums of said means; torque resisting means connecting the axle housings separate from said springs and from said fulcrumed means designed to allow a limited rotative movement of the housings comprising a plurality of spring bars having the opposite ends thereof confined in cylindrical caps to be united for simultaneous flexing, the cap on one end of said spring bars being fixedly attached to one of the axle housings and the other cap being slidably confined in the other axle housing, whereby the mediate portion of the spring bars is free to bend in a vertical plane to neutralize the torque tending to rotate the axle housings.

5. A road vehicle including a frame, tandem axle housings having driven axles therein; a spring pivotally associated with each of the opposite sides of the frame and having the ends connected to the spaced axle housings, means of connection between the frame and the end of each spring and the housing ends fulcrumed so that the housings are capable of independent swinging movement relatively to the frame around the fulcrums of said means; torque resisting means connecting the axle housings separate from said springs and from said fulcrumed means designed to allow a limited rotative movement of the housing consisting of a bar adapted to flex in a vertical plane, having one end thereof pivoted on a vertical axis to one of the axle housings to swing on a horizontal plane and the other end slidably confined in a vertical pivot on the other axle housing whereby said end of the bar is free to slide axially or rotate or swing on a horizontal plane when either of said axle housings moves in a vertical plane relative to the other or torque tends to rotate either housing or both housings.

6. In a vehicle, transverse axle housings, having driven axles therein, connected to each other with freedom of swinging and oscillating movement relative to each other, each axle housing having means of connection with a pair of supporting wheels, in combination with a chassis, a leaf spring pivotally mounted intermediate its ends upon each side of the chassis; a pair of radius rods on each side of the chassis each rod being pivotally mounted at one end and having the other end of each rod journaled to receive an end of each axle housing and being operatively connected to the opposite ends of the leaf spring on each side of the chassis; means to hold the respective axle housings in the journals in said radius rods with freedom of limited play in respect of the respective fulcrums of said rods on the chassis; a drive shaft connecting the driven axles in the axle housings; and a torque resisting means connecting the axle housings, independently of the drive shaft, being resiliently flexible in a vertical plane to permit a predetermined oscillating movement of the axle housings from the torque tending to rotate said housings.

7. In a vehicle, transverse axle housings having driven axles therein connected to each other with freedom of swinging and oscillating movement relative to each other, each axle housing having means of connection with a pair of supporting wheels, in combination with a chassis, a leaf spring pivotally mounted intermediate its ends upon each side of the chassis; a pair of radius rods on each side of the chassis each rod being pivoted mounted at one end and having the other end of each rod journaled to receive an end of each axle housing and being operatively connected to the opposite ends of the leaf spring on each side of the chassis, the respective axle housings being secured in the ends of said radius rods so as to be movable with the rocking of said radius rods on an arc around the fulcrum; resilient means associated with the pivoted ends of said rods on the chassis to permit limited variation of the fulcrums of said rods within predetermined limits; a drive shaft connecting the driven axles in the axle housings; and a torque resisting means connecting the axle housings, independently of the drive shaft, being resiliently flexible in a vertical plane to permit a predetermined oscillating movement of the axle housings from the torque tending to rotate said housings.

8. In a vehicle, transverse axle housings, having driven axles therein, connected to each other with freedom of swinging and oscillating movement relative to each other, each axle housing having means of connection with a pair of supporting wheels, in combination with a chassis, a leaf spring pivotally mounted intermediate its ends upon each side of the chassis; a pair of radius rods on each side of the chassis each rod being pivotally mounted at one end and having the other end of each rod journaled to receive an end of each axle housing and being operatively connected to the opposite ends of the leaf spring on each side of the chassis; the respective axle housings being secured in the ends of said radius rods so as to be movable with the rocking of said radius rods at a variable radial distance from the respective fulcrums of said rods on the chassis; a drive shaft connecting the driven axles in the axle housings; and a torque resisting means consisting of a plurality of spring bars having the opposite ends thereof confined in cylindrical caps, the cap on one end of said spring bars being fixedly attached to one of the axle housings and the other cap being slidably confined in the other axle housing, whereby the mediate portion of the spring bars is free to bend in a vertical plane to neutralize the torque tending to rotate the axle housings.

9. In a vehicle, transverse axle housings having driven axles therein connected to each other with freedom of swinging and oscillating movement relative to each other, each axle housing having means of connection with a pair of supporting wheels, in combination with a chassis, a leaf spring pivotally mounted intermediate its ends upon each side of the chassis; a pair of rigid elements on each side of the chassis each rod being pivotally mounted at one end and having the other end of each element journaled to receive an end of each axle housing and being operatively connected to the opposite ends of the leaf spring on each side of the chassis, the respective axle housings being secured in the ends of said rigid elements so as to be movable with the rocking of said rigid elements on an arc around the fulcrum; resilient means associated with the pivoted ends of said elements on the chassis to permit limited shifting of the fulcrums of said elements within predetermined limits; a drive shaft connecting the driven axles in the axle housings; and a torque resisting means consisting of a plurality of spring bars having the opposite ends thereof confined in cylindrical caps, the cap on one end of said spring bars being fixedly attached to one of the axle housings and the other cap being slidably confined in the other axle housing, whereby the mediate portion of the spring bars is free to bend in a vertical plane to neutralize the torque tending to rotate the axle housings.

10. In combination with a vehicle frame, tandem axle housings; a radius rod rotatably and slidably journaled at one end on each end of the axle housings and the other end of each radius rod being pivoted on a mounting resiliently slidable on the frame whereby the axle housings are capable of independent swinging movement on a variable arcuate path prescribed by the sliding and swinging movement of the radius rods; and a resilient equalizing arm pivoted on each of the opposite sides of the frame and flexibly connected to the ends of a pair of radius rods adjacent the axle housings.

11. In combination, a vehicle frame; tandem axle housings having traction wheels thereon; a drive shaft connecting said axle housings; torque neutralizing means connected to said housings; radius rods in which the respective ends of the axle housings are journaled; a pivotal mounting for each rod to adjustably mount the radius rods on the frame; and a spring support between the axle housings and frame; said connection between the radius rods and axle housings being adapted to permit either of the axle housings to slide axially and to oscillate so that the wheels on one housing will trail the wheels on the other housing when the vehicle moves around a curve.

LEWIS E. HOLMAN.